US008642713B2

(12) United States Patent
Louis et al.

(10) Patent No.: US 8,642,713 B2
(45) Date of Patent: Feb. 4, 2014

(54) POLY(ARYLETHERKETONE)S AND PROCESS FOR MAKING THEM

(75) Inventors: Chantal Louis, Alpharetta, GA (US); Satchit Srinivasan, Gainesville, GA (US); William Gandy, Alpharetta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 623 days.

(21) Appl. No.: 12/672,244

(22) PCT Filed: Aug. 8, 2008

(86) PCT No.: PCT/EP2008/060449
§ 371 (c)(1),
(2), (4) Date: Feb. 4, 2010

(87) PCT Pub. No.: WO2009/021918
PCT Pub. Date: Feb. 19, 2009

(65) Prior Publication Data
US 2011/0224399 A1   Sep. 15, 2011

Related U.S. Application Data

(60) Provisional application No. 60/955,042, filed on Aug. 10, 2007, provisional application No. 60/973,510, filed on Sep. 19, 2007.

(30) Foreign Application Priority Data

Jan. 10, 2008  (FR) ...................................... 08 50127
Apr. 8, 2008   (FR) ...................................... 08 52321

(51) Int. Cl.
*C08G 8/02* (2006.01)

(52) U.S. Cl.
USPC .......................................... 528/125; 528/126

(58) Field of Classification Search
USPC ................................................ 528/125, 126
See application file for complete search history.

(56) References Cited

U.S. PATENT DOCUMENTS

| 4,169,178 A | 9/1979 | Freeman |
| 4,176,222 A | 11/1979 | Cinderey et al. |
| 4,320,224 A | 3/1982 | Rose et al. |
| 4,636,557 A | 1/1987 | Deckers |
| 4,638,044 A | 1/1987 | Kelsey |
| 4,767,838 A * | 8/1988 | Clendinning et al. ........ 528/125 |
| 6,881,816 B2 | 4/2005 | Gharda et al. |

FOREIGN PATENT DOCUMENTS

| CA | 847963 | 7/1970 |
| DE | 4121139 A1 | 1/1993 |
| EP | 0211693 A1 | 2/1987 |
| EP | 0244167 A1 | 11/1987 |
| WO | WO 95/31502 A1 | 11/1995 |
| WO | WO 03/099907 A1 | 12/2003 |
| WO | WO 2005/030836 A1 | 4/2005 |

OTHER PUBLICATIONS

Kirk-Othmer Encyclopedia of Chemical Technology, 2004, Chapter 7 "Color", pp. 303-341, 39 pgs.
Historical Standard ASTM D4440-07 "Standard Test Method for Plastics: Dynamic Mechanical Properties: Melt Rheology", 2007, pp. 1-4, 5 pgs.
Roovers, J. et al., "Synthesis and Characterization of Narrow Molecular Weight Distribution Fractions of Poly(aryl ether ether ketone)", Macromolecules, 1990, vol. 23, pp. 1611-1618, 8 pgs.
Flory P.J., "Intrinsic Viscosity in Relation to Molecular Weights of High Polymers" in Chapter VII : "Determination of Molecular Weight" of book: "Principles of Polymer Chemistry", 1953, p. 308-315, Cornell University Press ; 9 pgs.
ASTM D2857—95(Reapproved 2007) "Standard Practice for Dilute Solution Viscosity of Polymers", 2007, pp. 1-6, 6 pgs.
Historical Standard ASTM D3835-02 "Standard Test Method for Determination of Properties of Polymeric Materials by Means of a Capillary Rheometer", 2002, pp. 1-11, 12 pgs.
ASTM E 308-01, "Practice for Computing the Colors of Objects by Using the CIE System", 2001, pp. 1-32, 32 pgs.
Shibata, M. et al., "Molecular structure of some model compounds for poly(aryl ether ketone)s", 1996, Macromolecular Chemistry & Physics, vol. 197, pp. 3297-3308, 12 pgs.
Bourgeois, Y. et al, "Synthesis of a poly(aryl ether sulfone)-poly(aryl ether ketone) triblock copolymer", 1996, Polymer, vol. 37, No. 24, pp. 5503-5511, 9 pgs.

* cited by examiner

*Primary Examiner* — Shane Fang
(74) *Attorney, Agent, or Firm* — Oblon, Spivak, McClelland, Maier & Neustadt, L.L.P.

(57) ABSTRACT

Improved poly(aryletherketone)s with superior melt stability, lower gel content and lower color and a new process for their manufacture.

20 Claims, No Drawings

POLY(ARYLETHERKETONE)S AND PROCESS FOR MAKING THEM

CROSS-REFERENCE TO RELATED APPLICATIONS

The present application is a U.S. national stage application under 35 U.S.C. §371 of International Application No. PCT/EP2008/060449 filed Aug. 8, 2008, which claims the benefit of U.S. provisional application No. 60/955,042 filed Aug. 10, 2007, U.S. provisional application No. 60/973,510 filed Sep. 19, 2007, French application FR 0850127 filed Jan. 10, 2008, and French application FR 0852321 filed Apr. 8, 2008, the whole content of all previously cited applications being herein incorporated by reference for all purposes.

Poly(aryletherketone)s (PAEK) have been known for many years. Poly(etheretherketone) (PEEK) and poly(etherketone) (PEK) are the most common PAEK. PEK and PEEK are high-strength, radiation-resistant engineering plastics whose structures combine both ether and ketone groups. Both are thermally stable and highly resistant to chemicals.

PAEK can be prepared from a variety of starting materials, either via a nucleophilic route or an electrophilic route.

PEEK is the most commercially significant PAEK. There are many superlatives that can be used to describe the properties of PEEK, and it is regarded by many as one of the best performing thermoplastics.

PEEK has greater strength, heat resistance and rigidity than many of the other engineering thermoplastics, it has good mechanical properties, including impact resistance, low wear rate, excellent thermal oxidative stability, good dielectric properties, outstanding chemical resistance, good resistance to hydrolysis and a low coefficient of friction, but more importantly, these properties are also retained over a wide temperature range. PEEK has also an excellent resistance to burning and very low flame spread, even when burning the material has one of the lowest smoke generation characteristics of the engineering thermoplastics. In addition, PEEK has good resistance to beta and X-rays, as well as exceptional resistance to gamma rays. These properties allow for ease of sterilization, and coupled with good biocompatibility, PEEK makes a strong candidate for medical applications.

PEEK can be prepared by various methods. One well known in the art method comprises reacting a substantially equimolar mixture of at least one bisphenol and at least one dihalobenzoid compound (for the two-monomer route) or at least one halophenol compound (for the one-monomer route) as described in Canadian Pat. No. 847,963. Preferred bisphenols in such a process are hydroquinone, 4,4'-dihydroxybiphenyl and 4,4'-dihydroxybenzophenone; preferred dihalobenzoid compounds in such a process are 4,4'-difluorobenzophenone, 4,4'-dichlorobenzophenone and 4-chloro-4'-fluorobenzophenone; preferred halophenols compounds in such a process are 4-(4-chlorobenzoyl)phenol and (4-fluorobenzoyl)phenol. Accordingly, PEEK homopolymers may notably be produced by the nucleophilic process as described in, for example, U.S. Pat. No. 4,176,222.

PEEK is generally prepared by reacting hydroquinone with 4,4'-difluorobenzophenone in diphenylsulfone in the presence of alkali-metal carbonates under an inert atmosphere at temperatures approaching the melting point of the polymer (>300° C.).

PEEK made via nucleophilic route is obtained as a white-off white powder. When crystallized from the melt, the product appears dark grey.

On the other hand, PEK has a higher Tg and a much higher degree of crystallinity than PEEK, hence higher temperature and chemical resistance. It also shows improved toughness.

PEK is generally produced by two nucleophilic routes: the two-monomer route or the one-monomer route. The two-monomer route, which is usually preferred, employs 4,4'-dihydroxybenzophenone in place of hydroquinone. The single-monomer route employs the alkali metal salt of 4-fluoro-4'-hydroxybenzophenone.

PAEK are known for their exceptional balance of technical properties, namely high melting point, good thermal stability, high stiffness and strength, good toughness and really excellent chemical resistance. Therefore, PAEK have potential for a wide variety of uses, and their favorable properties class them with the best of the engineering polymers. However, PAEK currently available to the trade suffer from certain disadvantages.

While prior art PAEK has acceptable melt stability, it may not be sufficient in certain demanding applications (such as melt filtration) where the PAEK are submitted to very high temperatures. PAEK featuring improved melt stability are thus needed by the art.

Attempts have already been made to improve the melt stability of PAEK.

U.S. Pat. No. 4,320,224 suggests to use a slight excess over equimolar of one of the dihalide, up to 5 mole %, results in the formation of halide end groups providing a polymer of greater thermal stability. However, due to the reversibility of the polymerization reaction, polymer with a high level of halide end groups is difficult to obtain (at the equilibrium there is still a substantial amount of OH end groups). This reference does not provide any quantitative information on the level of fluoride end groups required to achieve sufficient melt stability. Furthermore, precise control of the molecular weight using a stoichiometry imbalance requires a very high level of accuracy in the charging of the reactor, which is difficult to achieve at an industrial level. A process wherein the polymer is terminated when the target molecular weight has been reached is desirable.

Besides, U.S. Pat. No. 6,881,816 relates to the preparation of PEEK by an electrophilic route. It teaches that the nature of the end-group is critical for attaining PEEK featuring good thermal stability. PEEK prepared by the described process contains modified end-groups such as: -Ph, -Ph-$CH_3$, -Ph-O—$CH_3$, -Ph-O-Ph or -Ph-OH.

Prior art PAEK also suffer from the presence of defects. Defects are defined as local irregularities in an amorphous film, which lead to reduced transmission of light through the film. In a 50 to 51 µm-thick film illuminated with a halogen spotlight, any irregularity with a transmittance lower than 62% is a defect. Gels are defined as defects, with a transmittance of 30 to 62%, transmittance of above 62% being defined as transparent. In addition to an unacceptable cosmetic appearance, the presence of defects can affect the mechanical properties of the material in certain shapes with thin cross sections (such as films, fibers, wire coating).

Attempts have also already been made to reduce the defects as it may be observed on films made of PAEK.

U.S. Pat. No. 4,176,222, teaches that the combined use of sodium carbonate and potassium carbonate in the manufacture of poly(etheretherketone) avoid the presence of defects such as gels in compression molded film.

PAEK currently available to the trade have an inherent yellow to dark grey color as formed, which limits their use in certain specific applications where lighter colors are needed. PAEK having an improved, lighter color could find wider acceptance for many applications where color is a concern.

There was also a long felt need to obtain low colored PAEK that remain also low colored after molding or melt processed. Although the effect on mechanical properties may be minimal, the cosmetic appearance of articles made from such polymers may be unacceptable in certain specific applications. Lower color PAEK are thus clearly needed by the art and would represent a significant improvement over the PAEK currently available to the trade.

Attempts have also been made in the past to improve the colour of PAEK.

DE 4121139 B4 describes the synthesis of PEEK and teaches that oxygen should be excluded from the reaction medium during the polycondensation reaction in order to obtain low colored PEEK. Highly condensed aromatic ring systems such as anthracene is also used in order to obtain low colored PEEK. However, condensed polyaromatics, such as anthracene and perylene, being highly toxic compounds, a complete removal of these compounds from the polymer is required for many sensitive applications (food contact, etc).

U.S. Pat. No. 6,881,816 deals also with the issue of the manufacture of low colored PEEK is also mentioned since it further discloses that the treatment of PEEK with organic solvents (and formic acid) improves the color of PEEK powder. However, these treatments are specific to PEEK made via an electrophilic route. Their role is to remove, with an organic basic solvent, strong acid residuals from the acidic solvents and to reduce, with formic acid, 9-phenylenexanthydrol end groups formed by intramolecular reaction on a ketone group catalyzed by a strong acid. Unfortunately, the above mentioned treatments do not improve the color of PEEK made via a nucleophilic route.

A process, described in EP 0211 693 and more precisely in its example 4, was also known in the art. This process does not lead to the obtention of high molecular weight polymers due to a serious stoichiometry imbalance of the monomers.

The problems as above detailed of providing a PAEK with superior melt stability, lower gel content and lower color can be solved by the present invention, as detailed below.

Surprisingly, the Applicant has found that the presence of fluorine end groups has a great impact, not only on the thermal stability of the PAEK, but also on the quantity of defects as measured on films and on their color.

It is an object of the present invention to provide PAEK which exhibit unexpectedly advantageous properties.

It is also an object of the present invention to provide an improved process for the manufacture of PAEK of superior quality allowing an easy molecular weight control, a controlled microstructure of the polymer, and a control on the chain ends termination.

Besides, it is also an object of the present invention to provide PAEK which exhibit superior melt stability, less defects on films as well as a lower color, compared to the prior art PAEK.

The Invention

A first aspect of the present invention is related to an improved process for the manufacture of a poly(aryletherketone) (P) comprising the steps of:

a. forming a reaction medium by adding to a reactor:
   i. at least one α,ω difluorinated monomer (M1) and at least one α,ω dihydroxylated monomer (M2), and/or
   ii. at least one α monofluorinated, ω monohydroxylated monomer (M3); then
b. adding to the reactor at least one salt (S1) of an alkali metal (A) other than lithium; then
c. making the monomers and the salt (S1) react together, until the obtention of:
   a poly(aryletherketone) (P*) comprising recurring units derived from the monomers and having an intrinsic viscosity $\eta_{int}$* superior to 0.7, as measured in methane sulfonic at 30° C. according to ASTM D2857, and
   as a by-product, a fluoride salt (S2) of the alkali metal (A), said salt (S2) having a solubility of more than $5 \cdot 10^{-7}$ mol/kg in acetone at 25° C.,
   wherein, at the completion of step c, the ratio $[n_{M1}+(n_{M3}/2)]/[n_{M2}+(n_{M3}/2)]$ is from 0.97 to 1.03,
   where $n_{M1}$, $n_{M2}$ and $n_{M3}$ are respectively the total number of moles of (M1), (M2) and (M3) which have been added to the reactor until the completion of step c; then
d. forming the poly(aryletherketone) (P) from the poly(aryletherketone) (P*), said poly(aryletherketone) (P) having an intrinsic viscosity $\eta_{int}$ comprised between $0.8 \cdot \eta_{int}$* and $1.2 \cdot \eta_{int}$*, by adding successively to the reactor:
   1. at least one α,ω difluorinated compound (M1'), different from or identical to (M1); then
   2. at least one salt (S3) able to react with the fluoride salt (S2) to form a fluoride salt (S4), said salt (S3) having a solubility of more than $5 \cdot 10^{-7}$ mol/kg in acetone at 25° C. and said fluoride salt (S4) having a solubility of at most $5 \cdot 10^{-7}$ mol/kg in acetone at 25° C.; then
   3. at least one α,ω difluorinated compound (M1"), different from or identical to (M1) and (M1');
   wherein, at the beginning of the addition of the salt (S3), the ratio $[n_{M1}+n_{M1'}+(n_{M3}/2)]/[n_{M2}+(n_{M3}/2)]$ is above 1.03,
   where $n_{M1'}$ is the total number of moles of (M1') which has been added to the reactor after the completion of step c and until the beginning of the addition of the salt (S3) and
   wherein, at the completion of step d, the ratio $[n_{M1}+n_{M1'}+n_{M1''}+(n_{M3}/2)]/[n_{M2}+(n_{M3}/2)]$ is above 1.08,
   where $n_{M1''}$ is the total number of moles of (M1") which has been added to the reactor after the beginning of the addition of the salt (S3) and until the completion of step d; then
e. recovering the poly(aryletherketone) (P) from the reaction medium.

For the purpose of the present invention, the term "poly(aryletherketone)" (PAEK) is intended to denote any polymer of which more than 50 wt. % of the recurring units are recurring units (R1) of one or more formulae containing at least one arylene group, at least one ether group (—O—) and at least one ketone group [—C(=O)—].

Preferably, recurring units (R1) are chosen from:

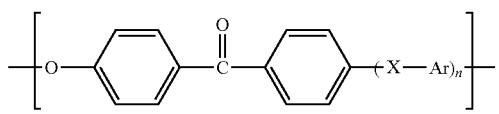

(I)

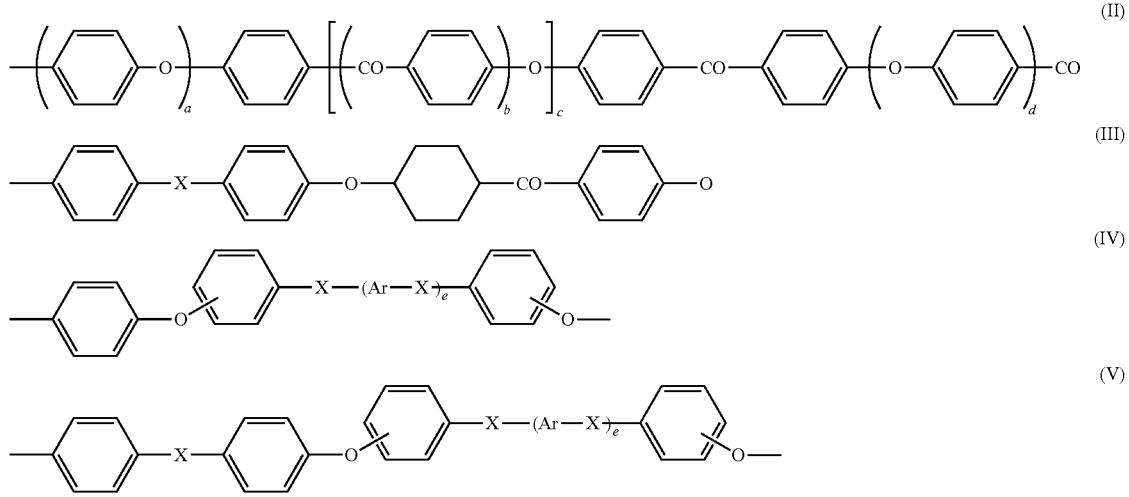
wherein:
Ar is independently a divalent aromatic radical selected from phenylene, biphenylene or naphthylene,
X is independently O, C(=O) or a direct bond,
n is an integer of from 0 to 3,
b, c, d and e are 0 or 1,
a is an integer of 1 to 4, and
preferably, d is 0 when b is 1.
More preferably, recurring units (R1) are chosen from:
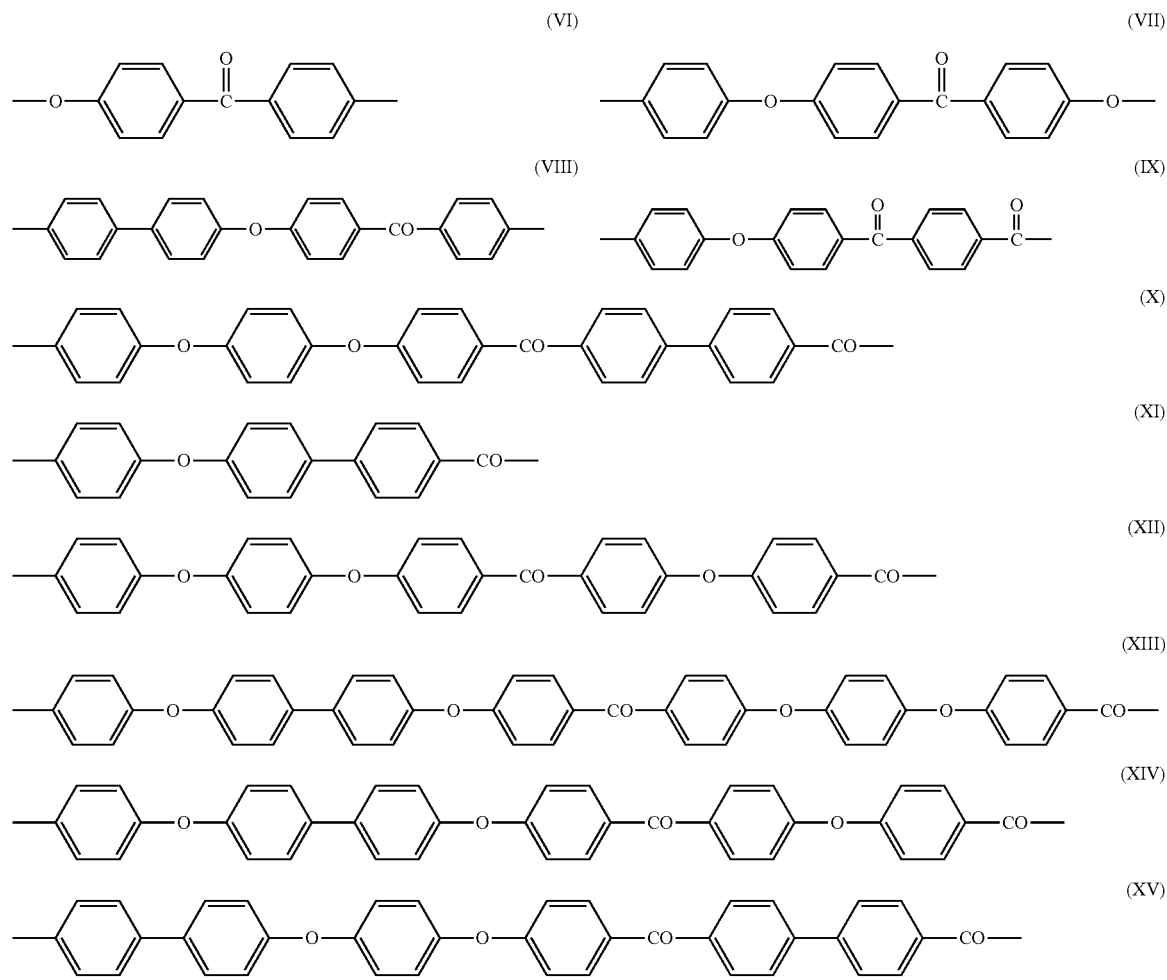

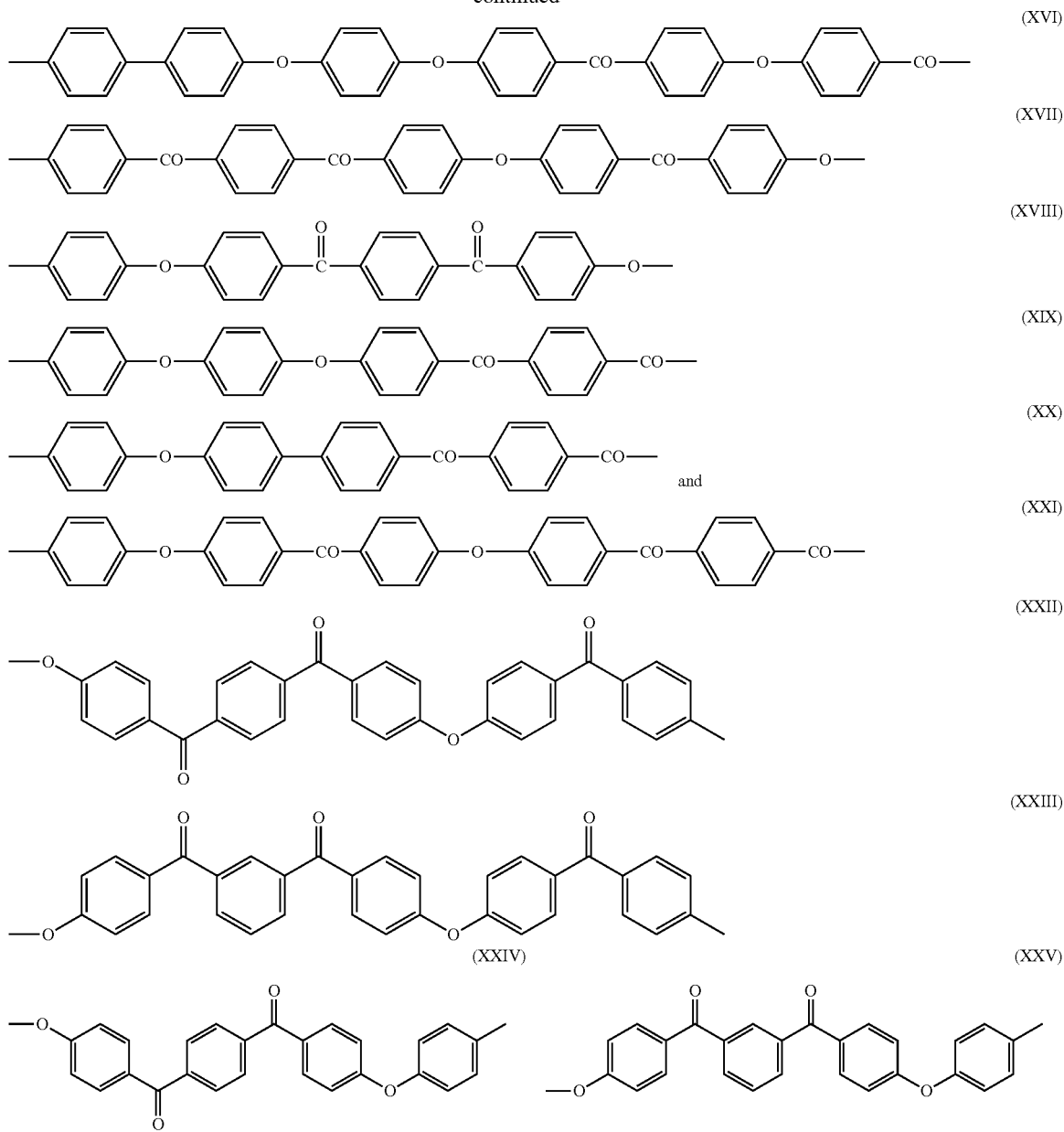
Still more preferably, recurring (R1) are chosen from:
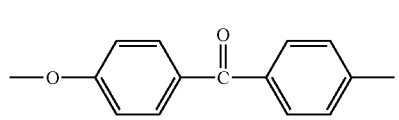
-continued
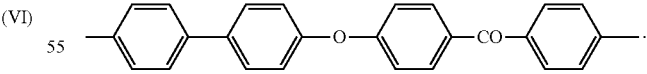
Most preferably, recurring units (R1) are:
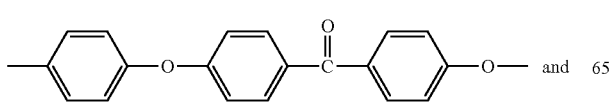 and 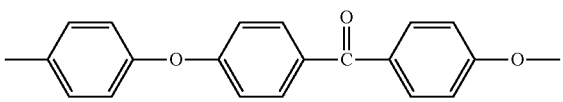

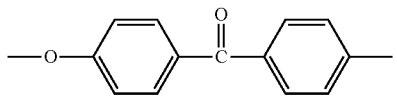

(VI)

For the purpose of the present invention, a "PEEK polymer" is intended to denote any polymer of which more than 50 wt. % of the recurring units are recurring units (R1) of formula (VII).

For the purpose of the present invention, a "PEK polymer" is intended to denote any polymer of which more than 50 wt. % of the recurring units are recurring units (R1) of formula (VI).

The poly(aryl ether ketone) may be notably a homopolymer, a random, alternate or block copolymer. When the poly(aryletherketone) is a copolymer, it may notably contain (i) recurring units (R1) of at least two different formulae chosen from formulae (VI) to (XXI), or (ii) recurring units (R1) of one or more formulae (VI) to (XXI) and recurring units (R1*) different from recurring units (R1).

Preferably more than 70 wt. %, more preferably more than 85 wt. % of the recurring units of the poly(aryletherketone) are recurring units (R1). Still more preferably, essentially all the recurring units of the poly(aryletherketone) are recurring units (R1). Most preferably, all the recurring units of the poly(aryletherketone) are recurring units (R1).

Excellent results were obtained when the poly(aryletherketone) was a PEEK homopolymer, i.e. a polymer of which essentially all, if not all, the recurring units are of formula (VII).

In step a of the invented process, a reaction medium is formed by adding to the reactor at least one α,β difluorinated monomer (M1) and at least one α,β dihydroxylated monomer (M2), and/or at least one a monofluorinated, ω monohydroxylated monomer (M3).

The α,β difluorinated monomer (M1) of the present invention may be represented by:

wherein α is any organic moiety.

Examples of (M1) are notably 4,4'-difluorobenzophenone, 1,4-bis(4'-fluorobenzoyl)benzene) and 1,3-bis(4'-fluorobenzoyl)benzene.

The α,β dihydroxylated monomer (M2) of the present invention may be represented by:

wherein β is any organic moiety.

Examples of (M2) are notably hydroquinone, 4,4'-dihydroxybenzophenone, 4'4-biphenol, 4,4'-oxybis(phenol), 1,4-dihydroxynaphthalene, 2,3-dihydroxynaphthalene and 1,6-dihydronaphthalene.

The α monofluorinated, ω monohydroxylated monomer (M3) of the present invention may be represented by:

wherein χ is any organic moiety.

Examples of (M3) are notably 4-fluoro-4'-hydroxybenzophenone, 1-(4'-fluorobenzoyl), 4-(4"-hydroxybenzoyl) benzene, 1-(4'-fluorobenzoyl), 3-(4"-hydroxybenzoyl)benzene.

In step b of the invented process, at least one salt (S1) of an alkali metal (A) other than lithium is added to the reactor.

The alkali metal (A) other than lithium is preferably selected from the group consisting of sodium, potassium and mixtures thereof. Sodium or mixtures of sodium and potassium are more preferred as alkali metal (A).

The salt (S1) of an alkali metal (A) other than lithium is preferably a salt of sodium and/or a salt of potassium. It is preferably a mixture of sodium carbonate and potassium carbonate.

The salt (S1) is generally added slowly to the reactor. Preferably, it is added at a speed of from 0.02 to 0.10 mol (salt (S1))/mol (repeat unit)·minute. This speed is more preferably above 0.03 mol (salt (S1))/mol (repeat unit)·minute, and most preferably above 0.04 mol (salt (S1))/mol (repeat unit)·minute. On the other hand, it is more preferably below 0.8 mol (salt (S1))/mol (repeat unit)·minute and most preferably below 0.06 mol (salt (S1))/mol (repeat unit)·minute. Excellent results were obtained when the mixture of sodium and potassium carbonate were added at a speed of about 0.05 mol (salt (S1))/mol (repeat unit)·minute.

Step b may begin before the completion of step a. However, step b is preferably pursued after the completion of step a.

In step c of the invented process, the monomers and the salt (S1) are reacted together, until the obtention of a poly(aryletherketone) (P*).

The poly(aryletherketone) (P*) comprises recurring units derived from the monomers. The polymerization may be followed by the measure of the intrinsic viscosity $\eta_{int}^*$ of the poly(aryletherketone) (P*). It is generally measured in methane sulfonic at 30° C. according to ASTM D2857. This $\eta_{int}^*$ grows to reach values superior to 0.7 dL/g. The intrinsic viscosity $\eta_{int}^*$ is preferably above 0.75, and more preferably above 0.8. On the other hand, it is preferably below 1.5, more preferably below 1.4.

In step c, a fluoride salt (S2) of the alkali metal (A), is also formed as a by-product. The salt (S2) has generally a solubility of more than $5 \cdot 10^{-7}$ mol/kg in acetone at 25° C. Preferably, it has a solubility of more than $6 \cdot 10^{-7}$ mol/kg, and more preferably of more than $8 \cdot 10^{-7}$ mol/kg. Examples of such fluoride salt (S2) are sodium fluoride and potassium fluoride.

Monomers (M1), (M2), and/or (M3) may be further added during steps b and/or c to the reactor, as long as, at the completion of step c, the ratio $[n_{M1}+(n_{M3}/2)]/[n_{M2}+(n_{M3}/2)]$ is from 0.97 to 1.03, where $n_{M1}$, $n_{M2}$ and $n_{M3}$ are respectively the total number of moles of (M1), (M2) and (M3) which have been added to the reactor until the completion of step c. The "total number of moles of (M1), (M2) and (M3)" is intended to denote the number of moles of (M1), (M2) and (M3) that have been added during step a, and possibly too during steps b and/or c and are thus present in the reactor at the completion of step c either as such, in unreacted monomeric form, or in a reacted form, typically in polymeric form.

Preferably, this ratio is above 0.98, more preferably, it is above 0.985 and most preferably, it is above 0.999. On the other hand, this ratio is preferably below 1.03, more preferably, it is below 1.025 and most preferably, it is below 1.02. Excellent results were obtained when the monomers (M1) and (M2) were reacted together in a substantially equimolar ratio. Deviations to this equimolarity may be searched for the production of certain particular PAEK.

The step c according to the invented process is generally carried out at ambient pressure. However, higher or lower pressure can also be used. Step c begins generally before completion of step b, depending on the reaction conditions and on the nature of the monomers.

In step d of the invented process, the poly(aryletherketone) (P) is formed from the poly(aryletherketone) (P*), said poly(aryletherketone) (P) having an intrinsic viscosity $\eta_{int}$ comprised between $0.8 \cdot \eta_{int}^*$ and $1.2 \cdot \eta_{int}^*$. Preferably, $\eta_{int}$ is of above $0.85 \cdot \eta_{int}^*$, more preferably of above $0.90 \cdot \eta_{int}^*$ and most preferably of above $0.95 \cdot \eta_{int}^*$. On the other hand, $\eta_{int}$ is of below $1.15 \cdot \eta_{int}^*$, more preferably of below $1.10 \cdot \eta_{int}^*$ and most preferably of below $1.05 \cdot \eta_{int}^*$.

The poly(aryletherketone) (P*) comprise chain ends, most of them being either fluoride end groups, or hydroxyl end groups. Other end groups such as quinone end groups or chlorine end groups may also be present on the poly(aryletherketone) (P*).

The poly(aryletherketone) (P) is formed by adding successively to the reactor (M1'), (S3) and (M1"). The first addition consists in the addition of at least one α,ω difluorinated compound (M1'), different from or identical to (M1). (M1') reacts with the chain ends of the poly(aryletherketone) (P*) to form the poly(aryletherketone) (P1*).

The α,ω difluorinated molecule (M1') is any α,ω difluorinated compound as above defined, different or identical to (M1). Excellent results were obtained when 4,4'-difluorobenzophenone and 1,4-bis(4'-fluorobenzoyl)benzene were used.

The poly(aryletherketone) (P1*) differ from the poly(aryletherketone) (P*) from its chain ends. The poly(aryletherketone) (P1*) comprise more fluoride end groups than the poly(aryletherketone) (P*). After the addition of (M1'), the intrinsic viscosity $\eta_{int}$ of (P1*) may go down, due to depolymerization. This change in the intrinsic viscosities of the polymer is usually dependent on the molecular weight of the poly(aryletherketone) (P*). High molecular weights poly(aryletherketone) (P*) are usually more sensitive to this change in the intrinsic viscosities. Generally, the ratio of the $\eta_{int}$ of (P1*) over the $\eta_{int}^*$ is comprised between 0.80 and 1.20, it is preferably comprised between 0.85 and 1.15.

One generally prefer to avoid the depolymerization of the poly(aryletherketone) (P*). Therefore, (M1') is preferably added rapidly to the reactor, in one time. Besides, the amount of depolymerization is dependent from the quantity of the fluoride salt (S2) present in the reactor at the beginning of step d. As a result, it is also preferred not to wait too long after the addition of (M1') before adding at least one salt (S3) able to react with the fluoride salt (S2) to form a fluoride salt (S4). Typically, the salt (S3) is added to the reactor a few minutes after the completion of the addition of (M1').

The salt (S3) has generally a solubility of more than $5 \cdot 10^{-7}$ mol/kg in acetone at 25° C. Preferably, it has a solubility of more than $6 \cdot 10^{-7}$ mol/kg, and more preferably of more than $8 \cdot 10^{-7}$ mol/kg. The salt (S3) may be chosen from lithium chloride, calcium chloride and magnesium chloride. It is preferably lithium chloride.

The fluoride salt (S4), formed in the reactor by the addition of the salt (S3), has generally a solubility of at most $5 \cdot 10^{-7}$ mol/kg in acetone at 25° C. Preferably, it has a solubility of at most $3 \cdot 10^{-7}$ mol/kg, and more preferably of at most $2 \cdot 10^{-7}$ mol/kg.

The addition of the salt (S3) has generally little or no influence on the intrinsic viscosity of the poly(aryletherketone) (P1*), since it mainly reacts with the salt (S2) and not with the poly(aryletherketone) (P1*).

At the beginning of the addition of the salt (S3), the ratio $[n_{M1}+n_{M1'}+(n_{M3}/2)]/[n_{M2}+(n_{M3}/2)]$ is above 1.03, where $n_{M1'}$ is the total number of moles of (M1') which has been added to the reactor after the completion of step c and until the beginning of the addition of the salt (S3). The "total number of moles of (M1')" is intended to denote the number of moles of (M1') that has been added after the completion of step c and until the beginning of the addition of the salt (S3) and are thus present in the reactor after the completion of step c and until the beginning of the addition of the salt (S3) either as such, in unreacted monomeric form, or in a reacted form, typically in polymeric form.

Preferably, this ratio is above 1.035, more preferably above 1.04 and most preferably above 1.05. On the other hand, it is preferably below 1.25, more preferably below 1.22 and most preferably below 1.20.

A further addition of at least one α,ω difluorinated compound (M1"), different from or identical to (M1) and (M1') is also required by the invented process. The α,ω difluorinated compound (M1") is any α,ω difluorinated compound as above defined, different or identical to (M1) and (M1'). Excellent results were obtained when 4,4'-difluorobenzophenone and 1,4-bis(4'-fluorobenzoyl)benzene were used.

This last addition may begin before the end of the addition of the salt (S3), while it is sometimes preferred that it begins after the completion of the addition of all the salt (S3).

At the completion of step d, the ratio $[n_{M1}+n_{M1'}+n_{M1''}+(n_{M3}/2)]/[n_{M2}+(n_{M3}/2)]$ is above 1.08, where $n_{M1''}$ is the number of moles of (M1") which has been added to the reactor after the completion of the addition of the salt (S3) and until the completion of step d, and are present in the reactor at the completion of step d either as such, in monomeric form, or in polymeric form. Preferably, it is above 1.085, more preferably above 1.09 and most preferably above 1.10. On the other hand, it is preferably below 1.25, more preferably below 1.22 and most preferably below 1.20.

Generally, the ratio of the $\eta_{int}$ of (P1*) over the $\eta_{int}$ of (P) is comprised between 0.90 and 1.10, it is preferably comprised between 0.95 and 1.05.

These 3 above mentioned additions in step d result in the endcapping of the poly(aryletherketone) (P*) to form the poly(aryletherketone) (P).

The steps a, b, c, d and e of the invented process may be carried out in the presence of an inert solvent. Preferably, during step c, the monomers and the salt (S1) are reacted together in the presence of a solvent. The solvent is preferably diphenylsulfone, benzophenone or dibenzothiophene dioxide, more preferably it is diphenylsulfone or dibenzothiophene dioxide. The most preferably, the solvent used is diphenylsulfone.

In the present invented process, the reactor is preferably heated on or before step c and until the end of step d. More preferably, the reactor is heated before step c. Most preferably, it is heated before step b.

The steps c and d of the invented process are generally carried out at a temperature comprised between 100° C. and 400° C., depending on the nature of the monomers and the solvent, if any, employed. Preferably, the temperature is above 250° C., more preferably above 275° C. and most preferably above 300° C. On the other hand, the temperature is preferably below 380° C. and most preferably below 350° C. For the production of certain poly(aryletherketone)s, it may be desirable to start the reaction at lower temperature, generally comprised between 100° C. and 250° C. and to increase the temperature as reaction ensues.

The steps c and d are generally carried out in an inert atmosphere.

Step d is carried out at the same temperature as the step c temperature or at a different temperature. Preferably, it is carried out at the same temperature.

Generally, the above described additions of (M1') and (M1") of this step d are carried out under condition of temperature and pressure so that (M1') and (M1") are in a liquid state. For example, if 4,4'-difluorobenzophenone is used as (M1') and (M1"), the temperature may be of about 320° C. and the pressure of about 23 psia (1.55 bar).

The process according to the present invention requires also another step, namely step e, wherein the poly(aryletherketone) (P) is recovered from the reaction medium. The reactor content is generally discharged and solidified by cooling. The ground reaction mixture may be extracted with solvents. The extraction with acetone and water at pH between 1 and 12 gave good results. The resulting polymer is then generally dried. Excellent results were obtained when the drying is carried out at 140° C. under air flow for 40 hours or at 120° C. at 50 mbar for 12 hours.

The process according to the present invention is advantageously pursued while taking care to avoid the presence of any reactive gases in the reactor. These reactive gases may be notably oxygen, water and carbon dioxide. O2 is the most reactive and should therefore be avoided.

In a particular embodiment, the reactor should be evacuated under vacuum and filled with an inert gas containing less than 20 ppm of reactive gases, and in particular less than 10 ppm of O2 prior to step a, b or c. Then, the reactor should be put under a constant purge of said inert gas until the end of the step d. The inert gas is any gas that is not reactive under normal circumstances. It may be chosen from nitrogen, argon or helium. The inert gas contains preferably less than 10 ppm oxygen, 20 ppm water and 20 ppm carbon dioxide. Generally, all solid reactants are also degassed with the inert gas as above defined prior to their introduction into the reactor. Since the salt (S1) is generally in the form of a powder, it is also preferably purged with the inert gas as above describes, before it is added to the reactor.

The process according to the present invention advantageously further comprises the step, prior to step b, of heating the reactor up to a temperature (T1) between 140° C. and 170° C. The temperature (T1) is preferably above 145° C., and more preferably above 147° C. It is also preferably less than 170° C. and more preferably less than 165° C. Excellent results were obtained with a temperature (T1) of about 155° C.

The process according to the present invention is especially well suited for the preparation of the poly(aryl ether ketone)s according to the present invention as described hereafter.

The Applicant has found that the presence of high levels of fluoride end groups on poly(aryletherketone)s leads to poly(aryletherketone)s featuring some advantageous properties.

Another aspect of the present invention is thus related to a poly(aryletherketone) comprising end groups, more than 40% of which are fluoride end groups, based on the total number of the end groups of the poly(aryletherketone).

Generally, the poly(aryletherketone) according to the present invention comprise more than 41% fluoride end groups, based on the total number of end groups. Preferably, they comprise more than 42%, of fluoride end groups, based on the total number of end groups.

Accordingly, another aspect of the present invention is related to a poly(aryletherketone) comprising end groups, less than 60% of which are selected from hydroxyl end groups, quinone end groups and chlorine end groups, based on the total number of the end groups of the poly(aryletherketone). Preferably, the poly(aryletherketone) according to the present invention comprises less than 58% of end groups selected from hydroxyl end groups, quinone end groups and chlorine end groups, based on the total number of the end groups of the poly(aryletherketone).

The poly(aryletherketone) comprising end groups, less than 60% of which are selected from hydroxyl end groups, quinone end groups and chlorine end groups, based on the total number of the end groups of the poly(aryletherketone) comprises also preferably more than 40% of fluoride end groups, based on the total number of the end groups of the poly(aryletherketone).

The Applicant has surprisingly found that when a relation between the content of the fluoride end groups of a poly(aryletherketone) and the melt viscosity of the poly(aryletherketone) is complied, the poly(aryletherketone) featured some outstanding properties.

Another aspect of the present invention is thus related to a poly(aryletherketone) comprising fluoride end groups, complying with the relation:

$$[F] \cdot V_M^{0.29} > 265$$

wherein:

[F] is the content of the fluoride end groups, expressed in µeq/g, and $V_M$ is the melt viscosity of the poly(aryletherketone) at 410° C. and 46.4 s$^{-1}$, as measured according to ASTM D3835, expressed in (Pa·s).

The poly(aryletherketone) complying with this relation may notably be a poly(etheretherketone) or a poly(etherketone).

The Applicant has also found that when a relation between the content of the end groups other than fluoride end groups of a poly(aryletherketone) and the melt viscosity of the poly(aryletherketone) is complied, the poly(aryletherketone) featured some outstanding properties.

Another aspect of the present invention is thus related to a poly(aryletherketone) comprising end groups other than fluoride end groups, complying with the relation:

$$[X] \cdot V_M^{0.29} < 390$$

wherein:

[X] is the content of the end groups other than fluoride end groups, expressed in µeq/g, and $V_M$ is the melt viscosity of the poly(aryletherketone) at 410° C. and 46.4 s$^{-1}$, as measured by capillary rheometer measurements according to ASTM D3835, expressed in (Pa·s).

The poly(aryletherketone) complying with this second relation may notably be a poly(etheretherketone) or a poly(etherketone).

The end groups other than fluoride end groups include generally hydroxyl, quinone and/or chlorine end groups.

Another aspect of the present invention is related to a poly(aryletherketone) comprising end groups, wherein less than 70 µeq/g of the end groups are end groups other than fluoride end groups. Generally, those end groups other than fluoride end groups include hydroxyl, quinone and/or chlorine end groups.

Preferably, the poly(aryletherketone) according to the present invention comprises less than 69 µeq/g, more preferably it comprises less than 66 µeq/g of end groups other than fluoride end groups, based on the total number of the end groups.

Poly(aryletherketone)s according to the present invention are also advantageously characterized by a low color. The color is generally characterized by L*, a*, b* values, which are tristimulus coordinates defined by the CIE (Commission Internationale de l'Eclairage) in 1976 (K. Nassau, in "Kirk-Othmer Encylopedia of Chemical Technology", 2004, Chapter 7, P 303-341). These three basic coordinates represent the lightness of the color (L*, L*=0 yields black and L*=100 indicates white), its position between red/magenta and green (a*, negative values indicate green while positive values indicate magenta) and its position between yellow and blue (b*, negative values indicate blue and positive values indicate yellow).

Another aspect of the present invention is related to a poly(aryletherketone) in the form of a powder, wherein it has a lightness L* of above 86, as measured according to ASTM E308 using Cool White Fluorescent as illuminant. Preferably, it has a lightness L* of above 87 and more preferably of above 88.

The poly(aryletherketone) of the present invention, in the form of a powder, may further have a* and b* coordinates of respectively between −1 and 1, and between 4 and 16, as measured according to ASTM E308 using Cool White Fluorescent as illuminant.

The poly(aryletherketone) of the present invention preferably has a* coordinate of less than 0.9 and more preferably of less than 0.8. On the other hand, it is preferably of more than −0.8 and more preferably of more than −0.6.

Besides, the poly(aryletherketone) of the present invention preferably has b* coordinate of less than 15.5 and more preferably of less than 15.0. On the other hand, it is preferably of more than 4.1 and more preferably of more than 4.2.

The color of poly(aryletherketone) molded into plaques may be very dependent on molecular weight.

Another aspect of the present invention is therefore related to a poly(aryletherketone) in the form of a powder, which, when the powder is molded into a compression molded plaque of 2.5 mm thick, the compression molded plaque has a lightness L* complying with the relation:

$$L^* > 90 - 17 \cdot (\eta_{int})$$

wherein L* is measured according to ASTM E308 using D 65 illuminant and $\eta_{int}$ is the intrinsic viscosity measured in methane sulfonic at 30° C. according to ASTM D2857, expressed in dL/g.

The compression molded plaque has a lightness L* complying advantageously with the relation $L^* > 91 - 17 \cdot (\eta_{int})$, preferably $L^* > 92 - 17 \cdot (\eta_{int})$, more preferably $L^* > 93 - 17 \cdot (\eta_{int})$, still more preferably $L^* > 94 - 17 \cdot (\eta_{int})$ and most preferably $L^* > 95 - 17 \cdot (\eta_{int})$.

The poly(aryletherketone) according to the present invention in the form of a powder, which, when the powder is molded into a compression molded plaque of 2.5 mm thick, the compression molded plaque further has a* and b* coordinates of respectively between −1 and 3, and between 5 and 20, as measured according to ASTM E308 using D 65 illuminant.

The poly(aryletherketone) of the present invention preferably has a* coordinate of less than 2.8 and more preferably of less than 2.5. On the other hand, it is preferably of more than −0.8 and more preferably of more than 0.5.

Besides, the poly(aryletherketone) of the present invention preferably has b* coordinate of less than 19 and more preferably of less than 18.5. On the other hand, it is preferably of more than 6 and more preferably of more than 6.5.

The PAEKs according to the present invention feature generally a L* value of above 66, as measured on compression molded plaque. It is preferably of above 68 and more preferably of above 70.

The PAEKs according to the present invention present also advantageously good melt stability. Melt stability may be experimented through melt viscosity stability measurements (VR40), using a parallel plates rheometer at 400° C., 10 rad/s, 5% strain, according to ASTM D4440.

Another aspect of the present invention is related to a poly(aryletherketone) having a melt viscosity ratio $VR_{40}$, defined as $$VR_{40} = V_{40}/V_{10},$$

of between 0.90 and 1.10, wherein $V_{10}$ and $V_{40}$ represent the melt viscosity at 400° C. and 10 rad/s respectively after 10 and 40 minutes, as measured by a parallel plate rheometer according to ASTM D4440.

The poly(aryletherketone) according to the present invention has preferably a $VR_{40}$ of less than 1.09 and more preferably of less than 1.08. On the other hand, it is preferably of more than 0.91 and more preferably of more than 0.92.

Besides, the poly(aryletherketone) according to the present invention feature also advantageously a reduced amount of defects as measured on extruded films. The defects (mostly gels and black specs) are defined as local irregularities in an amorphous film, which lead to reduced transmission of light through the film. In a 50 to 51 μm-thick film, illuminated with a halogen spotlight, any irregularity with a transmittance lower than 62% is a defect. Gels are defined as defects of less than 300 μm, with a transmittance of 30 to 62%, transmittance of above 62% being defined as transparent.

Another aspect of the present invention is related to a poly(aryletherketone), which, when formed into an amorphous 50.8 μm thick film, the film has a defect content of lower than 60,000 defects/m².

Preferably, this defect content is of lower than 55,000 defects/m², more preferably of lower than 50,000 defects/m² and most preferably of lower than 40,000 defects/m².

The poly(aryletherketone) according to the present invention, when formed into an amorphous 50.8 μm thick film, has a gel content of lower than 60,000 gels/m².

Preferably, this gel content is of lower than 55,000 defects/m², more preferably of lower than 50,000 gels/m² and most preferably of lower than 40,000 gels/m².

Preferably, the poly(aryletherketone) according to the present invention complies with at least 2, more preferably with at least 3 and most preferably with essentially all the above discussed specific features.

Still another aspect of the present invention is related to a method for determining the quantity of fluoride end groups in a polymer, said method comprising the steps of:
i. taking an $^{19}F$ NMR spectrum of a sample comprising the polymer and a weighted amount of an external fluorinated standard; then
ii. determining the quantity of fluoride end groups from the intensities of at least one resonance peak associated to the fluorine end groups and at least one resonance peak associated to the external fluorinated standard.

This method is especially well suited for determining the quantity of fluoride end groups in poly(aryletherketone) or poly(etheretherketone).

Preferably, the sample comprising the polymer and a weighted amount of an external fluorinated standard is dissolved in an appropriate NMR solvent such as $CD_2Cl_2$. A second solvent may be added to this solution to reach higher solubilities of both the polymer and the external fluorinated standard. Provided below are examples illustrative of the present invention, but not limitative thereof.

EXAMPLES

Example 1

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.82 g of diphenyl sulfone, 28.60 g of hydroquinone and 57.52 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 28.4259 g of $Na_2CO_3$ and 0.1800 g of $K_2CO_3$ was added via a powder dispenser to the reaction mixture over 30 minutes. At the end of the addition, the reaction mixture was heated to 320° C. at 1° C./minute. After 20 minutes at 320° C., 6.8203 g of 4,4'-difluorobenzophenone were added to the reaction mixture while keeping a nitrogen purge on the reactor. After 5 minutes, 0.4420 g of lithium chloride were added to the reaction mixture. 10 minutes later, another 2.2734 g of 4,4'-difluorobenzophenone were added to the reactor.

The reactor content was then poured from the reactor into a SS pan and cooled. The solid was broken up and ground in an attrition mill through a 2 mm screen. Diphenylsulfone and salts were extracted from the mixture with acetone and water at pH between 1 and 12. The powder was then removed from the reactor and dried at 120° C. under vacuum for 12 hours yielding 59.70 g of a white powder.

The material exhibited an intrinsic viscosity measured in methane sulfonic acid at 30° C. of 1.162, which corresponds to a $M_v$ of 34420 ($M_n$ 17930) using Mark-Houwink-Sakurada equation developed for poly(etheretherketone) in Roovers et al., Macromolecules, 1990, Vol 23, P 1611-1618.

The melt viscosity of the material measured at 410° C., 46.4 $s^{-1}$ was 430.9 Pa s.

The content of arylfluoride end groups determined by $^{19}F$ NMR in $CD_2Cl_2/CH_3SO_3H$ was 48 µeq/g, which represents 43% of the end groups. By difference the amount of OH and quinone end groups was 64 µeq/g, i.e. 57% of total end groups.

The product [F] $V_m^{0.29}$ was 279 (µeq/g) (Pa s)$^{0.29}$.

The product [Other end groups] $V_m^{0.29}$ was 369 (µeq/g) (Pa s)$^{0.29}$.

The color of the material was measured on the white powder (200-500 µm average particle size) under Cool White Fluorescent light source. The L*, a*, b* values recorded were: L*=90.40, a*=0.15, b*=4.92.

The color of a molded plaque (beige) (2.5 mm thick obtained by compression molding at 370° C./19.4 bar/15 minutes then 370° C./26.1 bar,/5 minutes. To ensure full crystallization, the plaque was slowly cooled down to room temperature over 40 minutes) measured under D65 light source at 10° angle was: L*=70.59, a*=1.09, b*=9.62.

Example 2

The same procedure as example 1 was followed but on a larger scale in a 5 L Hastelloy C reactor.

1.703 kg diphenylsulfone, 0.7648 kg 4,4'-difluorobenzophenone, 0.3819 kg hydroquinone were mixed under nitrogen at 150° C. and a mixture of 0.3794 kg sodium carbonate and 0.00216 kg potassium carbonate were added to the monomer mixture over 45 minutes. After addition of the carbonates, the reaction mixture was heated up to 320° C. at 1° C./minute. After 14 minutes at 320° C., 0.09082 kg of 4,4'-difluorobenzophenone were added to the reactor and the reactor pressure was increased to 2 bars for 5 minutes. The pressure was brought back to 1 bar and 0.001764 kg LiCl were added to the reaction mixture, which was held under atmospheric pressure for 10 minutes. Then 0.03027 kg of 4,4'-difluorobenzophenone were added to the reactor and the pressure was increased to 2 bars. The reactor was kept under pressure for 15 minutes. The pressure on the reactor was then relieved and the reactor content was discharged and solidified by cooling. The ground reaction mixture was extracted with acetone and water at pH between 1 and 12. The resulting polymer was dried at 120° C. under vacuum for 12 hours yielding 0.815 kg of a white powder.

The material exhibited an intrinsic viscosity measured in methane sulfonic acid at 30° C. of 1.128, which corresponds to a $M_v$ of 33170 ($M_n$ 17280) using Mark-Houwink-Sakurada equation developed for poly(etheretherketone) in Roovers et al., Macromolecules, 1990, Vol 23, P 1611-1618.

The melt viscosity of the material measured at 410° C., 46.4 $s^{-1}$ was 252.4 Pa s.

The content of arylfluoride end groups determined by $^{19}F$ NMR in $CD_2Cl_2/CH_3SO_3H$ was 55 µeq/g, which represents 48% of the end groups. By difference the amount of OH and quinone end groups was 60 µeq/g, i.e. 52% of the total end groups.

The product [F] $V_m^{0.29}$ was 275 (µeq/g) (Pa s)$^{0.29}$.

The product [Other end groups] $V_m^{0.29}$ was 300 (µeq/g) (Pa s)$^{0.29}$.

The color of the material was measured on the white powder (200-500 µm average particle size) under Cool White Fluorescent light source. The L*, a*, b* values recorded were: L*=91.14, a*=0.08, b*=4.45.

The color of a molded plaque (beige) (2.5 mm thick obtained by compression molding at 370° C./19.4 bar/15 minutes then 370° C./26.1 bar,/5 minutes. To ensure full crystallization, the plaque was slowly cooled down to room temperature over 40 minutes) measured under D65 light source at 10° angle was: L*=79.32, a*=1.03, b*=7.23.

Example 3

The same procedure as example 1 was followed but on a larger scale in a 5 L Hastelloy C reactor.

1.703 kg diphenylsulfone, 0.7606 kg 4,4'-difluorobenzophenone, 0.3819 kg hydroquinone were mixed under nitrogen at 150° C. and a mixture of 0.3790 kg sodium carbonate and 0.0024 kg potassium carbonate were added to the monomer mixture over 45 minutes. After addition of the carbonates, the reaction mixture was heated up to 320° C. at 1° C./minute. After 10 minutes at 320° C., 0.0908 kg of 4,4'-difluorobenzophenone were added to the reactor and the reactor pressure was increased to 2 bars for 5 minutes. The pressure was brought back to 1 bar and 0.0088 kg LiCl were added to the reaction mixture, which was held under atmospheric pressure for 10 minutes. Then 0.0303 kg of 4,4'-difluorobenzophenone were added to the reactor and the pressure was increased to 2 bars. The reactor was kept under pressure for 15 minutes. The pressure on the reactor was then relieved and the reactor content was discharged and solidified by cooling. The ground reaction mixture was extracted with acetone and water at pH between 1 and 12. The resulting polymer was dried at 120° C. under vacuum for 12 hours yielding 0.823 kg of a white powder.

The material exhibited an intrinsic viscosity measured in methane sulfonic acid at 30° C. of 1.361, which corresponds to a $M_v$ of 41800 ($M_n$ 21750) using Mark-Houwink-Sakurada equation developed for poly(etheretherketone) in Roovers et al., Macromolecules, 1990, Vol 23, P 1611-1618.

The melt viscosity of the material measured at 410° C., 46.4 $s^{-1}$ was 817.1 Pa s.

The content of arylfluoride end groups determined by $^{19}F$ NMR in $CD_2Cl_2/CH_3SO_3H$ was 46 µeq/g, which represents 50% of the end groups. By difference the amount of OH and quinone end groups was 46 µeq/g, i.e. 50% of total end groups.

The product [F] $V_m^{0.29}$ was 322 (µeq/g) (Pa s)$^{0.29}$.

The product [Other end groups] $V_m^{0.29}$ was 321 (µeq/g) (Pa s)$^{0.29}$.

The color of the material was measured on the white powder (200-500 µm average particle size) under Cool White Fluorescent light source. The L*, a*, b* values recorded were: L*=87.15, a*=0.27, b*=7.20.

The color of a molded plaque (beige) (2.5 mm thick obtained by compression molding at 370° C./19.4 bar/15 minutes then 370° C./26.1 bar,/5 minutes. To ensure full crystallization, the plaque was slowly cooled down to room temperature over 40 minutes) measured under D65 light source at 10° angle was: L*=75.44, a*=0.84, b*=8.78.

The melt stability of the material was assessed with a parallel plates rheometer at 400° C., 10 rad/s, 5% strain: the melt viscosity measured after 10 minutes was 1251 Pa s and 1316 Pa s after 40 minutes, which is a 5% change.

The gels content was determined on extruded film of 50.8 μm thick by OCS. The number of defects smaller than 300 μm was 34 000 defects/m².

Comparative Example 1

1.703 kg diphenylsulfone, 0.7606 kg 4,4'-difluorobenzophenone, 0.3819 kg hydroquinone, 0.3680 kg sodium carbonate and 0.00959 kg potassium carbonate were mixed under nitrogen at 150° C.

The reaction mixture was heated slowly to 200° C. (1 hour heating period) and held at 200° C. for 30 minutes then heated up to 250° C., held at 250° C. for 30 minutes, heated up to 310° C. and held at this temperature for 30 minutes.

End capping was carried out by adding 0.0189 kg DFBP and, 65 minutes later, 0.0250 kg LiCl to the reaction mixture and keeping the mixture at 310° C. for an additional 30 minutes.

The reactor content was then discharged and solidified by cooling. The ground reaction mixture was extracted with acetone and water at pH between 1 and 12. The resulting polymer was dried at 140° C. under air flow for 40 hours yielding 0.805 kg of a white powder.

The material exhibited an intrinsic viscosity measured in methane sulfonic acid at 30° C. of 0.987, which corresponds to a $M_v$ of 28200 ($M_n$ 14680) using Mark-Houwink-Sakurada equation developed for poly(etheretherketone) in Roovers et al., Macromolecules, 1990, Vol 23, P 1611-1618.

The melt viscosity of the material measured at 410° C., 46.4 s$^{-1}$ was 232.210 Pa s.

The content of arylfluoride end groups determined by $^{19}$F NMR in $CD_2Cl_2/CH_3SO_3H$ was 54 μeq/g, which represents 40% of the end groups. By difference the amount of OH and quinone end groups was 82 μeq/g, i.e. 60% of total end groups.

The product [F] $V_m^{0.29}$ was 262 (μeq/g) (Pa s)$^{0.29}$.

The product [Other end groups] $V_m^{0.29}$ was 399 (μeq/g) (Pa s)$^{0.29}$.

The color of the material was measured on the gray powder (200-500 μm average particle size) under Cool White Fluorescent light source. The L*, a*, b* values recorded were: L*=85.26, a*=0.43, b*=6.87.

The color of a molded plaque (gray) (2.5 mm thick obtained by compression molding at 370° C./19.4 bar/15 minutes then 370° C./26.1 bar,/5 minutes. To ensure full crystallization, the plaque was slowly cooled down to room temperature over 40 minutes) measured under D65 light source at 10° angle was: L*=65.38, a*=0.90, b*=4.94.

Comparative Example 2

The same procedure as example 2 was followed but on a larger scale in a 5 L Hastelloy C reactor.

1.703 kg diphenylsulfone, 0.7606 kg 4,4'-difluorobenzophenone, 0.3819 kg hydroquinone, 0.3569 kg sodium carbonate and 0.0240 kg potassium carbonate were mixed under nitrogen at 150° C.

The reaction mixture was heated slowly to 200° C. (1 hour heating period) and held at 200° C. for 30 minutes then heated up to 250° C., held at 250° C. for 30 minutes, heated up to 310° C. and held at this temperature for 40 minutes.

End capping was carried out by adding 0.0189 kg DFBP and, 20 minutes later, 0.0294 kg LiCl to the reaction mixture and keeping the mixture at 310° C. for an additional 30 minutes.

The reactor content was then discharged and solidified by cooling. The ground reaction mixture was extracted with acetone and water at pH between 1 and 12. The resulting polymer was dried at 120° C. under vacuum for 12 hours yielding 0.791 kg of a white powder.

The material exhibited an intrinsic viscosity measured in methane sulfonic acid at 30° C. of 1.307, which corresponds to a $M_v$ of 39750 ($M_n$ 20700) using Mark-Houwink-Sakurada equation developed for poly(etheretherketone) in Roovers et al., Macromolecules, 1990, Vol 23, P 1611-1618.

The melt viscosity of the material measured at 410° C., 46.4 s$^{-1}$ was 1044.0 Pa s.

The content of arylfluoride end groups determined by $^{19}$F NMR in $CD_2Cl_2/CH_3SO_3H$ was 26 μeq/g, which represents 27% of the end groups. By difference the amount of OH and quinone end groups was 71 μeq/g, i.e. 73% of total end groups.

The product [F] $V_m^{0.29}$ was 195 (μeq/g) (Pa s)$^{0.29}$.

The product [Other end groups] $V_m^{0.29}$ was 530 (μeq/g) (Pa s)$^{0.29}$.

The color of the material was measured on the white powder (200-500 μm average particle size) under Cool white Fluorescent light source. The L*, a*, b* values recorded were: L*=82.63, a*=0.43, b*=7.13.

The color of a molded plaque (gray) (2.5 mm thick obtained by compression molding at 370° C./19.4 bar/15 minutes then 370° C./26.1 bar,/5 minutes. To ensure full crystallization, the plaque was slowly cooled down to room temperature over 40 minutes) measured under D65 light source at 10° angle was: L*=62.49, a*=0.93, b*=4.47.

The melt stability of the material was assessed with a parallel plates rheometer at 400° C., 10 rad/s, 5% strain: the melt viscosity measured after 10 minutes was 2133.6 Pa s and 2781.7 Pa s after 40 minutes, which is a 30% change.

The gels content was determined on extruded film (50.8 μm thick) by OCS. The number of defects smaller than 300 μm (=gels) was 115 000 defects/m².

Color Measurements

All measurements were made on Gretag Macbeth Color Eye Ci5 Spectrophotometer.

For powders (average particle size of 400-600 μm), a 50 g sample was placed in colorimeter quartz cell. Ten readings were taken at different angles and the average value is given. The illuminant used was Cool White Fluorescent. Specular light was excluded from the color measurement.

Plaques were 2.5 mm thick and obtained by compression molding at 370° C./19.4 bar/15 minutes then 370° C./26.1 bar,/5 minutes. To ensure full crystallization, the plaques were slowly cooled down to room temperature over 40 minutes. Colors were measured directly on the spectrometer eye and only one reading was taken. The illuminant was D65 (natural daylight).

Melt Viscosity and Melt Stability Measurements

Melt viscosity measurements were made with a capillary rheometer according to ASTM D3835. Readings were taken at 410° C., at a shear rate of 46.4 s$^{-1}$, using a die with the following characteristics: diameter: 1.016 mm, length: 20.32 mm, cone angle 120°.

Parallel plates rheology measurements were made according to ASTM D4440, at 400° C., 10 rad/s, 5% strain.

Gel Content Measurements

The gel content was assessed by OCS reading on an amorphous extruded film. Extrusion conditions were: single screw 20 mm extruder, heating zones at 385° C.-390° C., starve feeding. The extruded film is quenched to 100° C. using chill rolls. The film is 50.8 μm thick, 5.08 to 7.62 cm wide. The defects (gels, black specs) are determined by OCS (150 W halogen spotlight) on a 1 m$^2$ surface of the film. Gels are defined as defects, with a transmittance of 30 to 62%. Transmittance of above 62% is defined as transparent.

Fluorine End Groups Quantification

Intrinsic viscosities were measured at 30° C. in anhydrous methane sulfonic acid using a Cannon-Fenske viscometer tube (No. 50) according to ASTM D2857. The average of inherent viscosities and reduced viscosities extrapolated to zero concentrations was used. The Mark-Houwink-Sakurada equation developed for poly(ether ether ketone) in Roovers et al., Macromolecules, 1990, Vol 23, P 1611-1618, was used to determine viscosity average molecular weight ($M_v$). The number average number molecular weight ($M_n$) was calculated using the a exponent determined by Roovers et al, and the equation developed by Flory (Chapter VII in P. J. Flory, "Principles of Polymer Chemistry", Cornell University Press, 1953):

$$M_n = \frac{M_v}{1.92} \qquad \text{Eq. 1}$$

Total end groups concentration (TEG expressed in μeq/g) is thus estimated as:

$$TEG(\mu eq/g) = \frac{2 \cdot 10^6}{M_n} \qquad \text{Eq. 2}$$

Aryl fluoride end groups may have the following structure, wherein Ar is an aryl group:

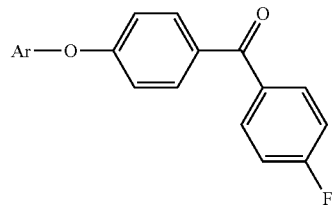

The concentration of aryl fluoride end groups was determined by $^{19}$F NMR. Approximately 10 mg of the polymer was dissolved in 0.55 mL $CD_2Cl_2$ and a few drops of methane sulfonic acid to obtain a clear solution. The $^{19}$F NMR spectra were recorded at 30° C. on a 400 MHz BRUKER Avance 400 spectrometer. Hexafluoroacetone trihydrate ($HFA.3H_2O$) was used as an external standard. The calibration of the $^{19}$F NMR spectrum in $CD_2Cl_2/CH_3SO_3H$ was performed by placing the chemical shift of $^{19}$F signal of $HFA.3H_2O$ at −82.5 ppm. The arylfluoride end group gives a $^{19}$F signal at −94 to −95 ppm chemical shift. The aryl fluoride end group concentration [F] was calculated using the following equation:

$$[F] = \frac{I_{Arylfluoride} * HFA \cdot 3H_2O \text{ weight} * 6}{I_{HFA \cdot 3H2O} * 220.07 * \text{polymer sample weight}} * 10^6 \qquad \text{Eq. 3}$$

wherein:
all weights are in g
[F] is in μeq/g
$I_{aryl\,fluoride}$ is the integral value of the $^{19}$F NMR signal at −94 to −95 ppm (polymer sample spectrum)
$I_{HFA.3H2O}$ is the integral value of the $^{19}$F NMR signal at −82.5 ppm (external standard spectrum-signal is for 6F)

The concentrations of other end groups, which are generally hydroxyl and quinones end groups is calculated by difference:

$$[\text{other end groups}] = TEG - [F] \qquad \text{Eq. 4}$$

Another approximation for the proportion of aryl fluoride end groups in the polymer is given by the product:

$$[F]Vm^{\frac{1}{3.4}} = [F]Vm^{0.29} \qquad \text{Eq. 5}$$

Wherein [F] is the concentration of aryl fluoride end groups measured by $^{19}$F NMR and Vm is the melt viscosity measured at 410° C., 46.4 s$^{-1}$.

TABLE 1

| | \multicolumn{5}{c}{Experimental results} | | | | |
|---|---|---|---|---|---|
| | E1 | E2 | E3 | CE1 | CE2 |
| Mv | 34420 | 33170 | 41800 | 28200 | 39750 |
| Mn | 17930 | 17280 | 21750 | 14680 | 20700 |
| Intrinsic viscosity | 1.162 | 1.128 | 1.361 | 0.987 | 1.307 |
| Melt viscosity (410° C., 46.4 s$^{-1}$) (Pa · s) by capillary rheometer | 430.9 | 252.4 | 817.1 | 232.2 | 1044.0 |
| Melt viscosity by parallel plate rheometer (400° C., 10 rad/s, 5% strain) (Pa s) | | | | | |
| after 10 minutes | | | 1251 | | 2133.6 |
| after 40 minutes | | | 1316 | | 2781.7 |

TABLE 1-continued

Experimental results

|  | E1 | E2 | E3 | CE1 | CE2 |
|---|---|---|---|---|---|
| $VR_{40}$ |  |  | 1.05 |  | 1.30 |
| [F] $V_m^{0.29}$ (µeq/g) (Pa s)$^{0.29}$ | 279 | 275 | 322 | 262 | 195 |
| [X] $V_m^{0.29}$ (µeq/g) (Pa s)$^{0.29}$ | 369 | 300 | 321 | 399 | 530 |
| Gel content (defects/m$^2$) |  |  | 34,000 |  | 115,000 |
| 90 − 17*$\eta_{int}$ | 70.25 | 70.82 | 66.86 | 73.22 | 67.78 |
| Fluoride end groups content (µeq/g) | 48 | 55 | 46 | 54 | 26 |
| Fluoride end groups (%) | 43 | 48 | 50 | 40 | 27 |
| Other end groups content (µeq/g) | 64 | 60 | 46 | 82 | 71 |
| Other end groups (%) | 57 | 52 | 50 | 60 | 73 |
| Color measurements |  |  |  |  |  |
| On powder |  |  |  |  |  |
| L* | 90.40 | 91.14 | 87.15 | 85.26 | 82.63 |
| a* | 0.15 | 0.08 | 0.27 | 0.43 | 0.43 |
| b* | 4.92 | 4.45 | 7.20 | 6.87 | 7.13. |
| On molded plaque |  |  |  |  |  |
| L* | 70.59 | 79.32 | 75.44 | 65.38 | 62.49 |
| a* | 1.09 | 1.03 | 0.84 | 0.90 | 0.93 |
| b* | 9.62 | 7.23 | 8.78 | 4.94 | 4.47 |

The invention claimed is:

1. A process for the manufacture of a poly(aryletherketone) (P) comprising:
   a. forming a reaction medium by adding to a reactor:
      i. at least one α,ω difluorinated monomer (M1) and at least one α,ω dihydroxylated monomer (M2), and/or
      ii. at least one a monofluorinated, ω monohydroxylated monomer (M3); then
   b. adding to the reactor at least one salt (S1) of an alkali metal (A) other than lithium; then
   c. making the monomers and the salt (S1) react together, until the obtention of:
      a poly(aryletherketone) (P*) comprising recurring units derived from the monomers and having an intrinsic viscosity $\eta_{int}^*$ superior to 0.7, as measured in methane sulfonic at 30° C. according to ASTM D2857, and as a by-product, a fluoride salt (S2) of the alkali metal (A),
      said salt (S2) having a solubility of more than 5·10$^7$ mol/kg in acetone at 25° C.,
      wherein, at the completion of c, the ratio $[n_{M1}+(n_{M3}/2)]/[n_{M2}+(n_{M3}/2)]$ is from 0.97 to 1.03,
      where $n_{M1}$, $n_{M2}$ and $n_{M3}$ are respectively the total number of moles of (M1), (M2) and (M3) which have been added to the reactor until the completion of c; then
   d. forming the poly(aryletherketone) (P) from the poly(aryletherketone) (P*), said poly(aryletherketone) (P) having an intrinsic viscosity $\eta_{int}$ comprised between $0.8 \cdot \eta_{int}^*$ and $1.2 \cdot \eta_{int}^*$, by adding successively to the reactor:
      1. at least one α,ω difluorinated compound (M1'), different from or identical to (M1); then
      2. at least one salt (S3) able to react with the fluoride salt (S2) to form a fluoride salt (S4), said salt (S3) having a solubility of more than 5·10$^{-7}$ mol/kg in acetone at 25° C. and said fluoride salt (S4) having a solubility of at most 5·10$^{-7}$ mol/kg in acetone at 25° C.; then
      3. at least one α,ω difluorinated compound (M1"), different from or identical to (M1) and (M1');

wherein, at the beginning of the addition of the salt (S3), the ratio $[n_{M1}+n_{M1'}+(n_{M3}/2)]/[n_{M2}+(n_{M3}/2)]$ is above 1.03,
      where $n_{M1'}$ is the total number of moles of (M1') which has been added to the reactor after the completion of c and until the beginning of the addition of the salt (S3) and
      wherein, at the completion of d, the ratio $[n_{M1}+n_{M1'}+n_{M1''}+(n_{M3}/2)]/[n_{M2}+(n_{M3}/2)]$ is above 1.08,
      where $n_{M1''}$ is the total number of moles of (M1") which has been added to the reactor after the beginning of the addition of the salt (S3) and until the completion of d; then
   e. recovering the poly(aryletherketone) (P) from the reaction medium.

2. The process according to claim 1, wherein the α,ω difluorinated monomer (M1) is at least one selected from the group consisting of 4,4'-difluorobenzophenone, 1,4-bis(4'-fluorobenzoyl)benzene, and 1,3-bis(4'-fluorobenzoyl)benzene, and wherein the α,ω dihydroxylated monomer (M2) is at least one selected from the group consisting of hydroquinone, 4,4'-dihydroxybenzophenone, 4'4-biphenol, 4,4'-oxybis(phenol), 1,4-dihydroxynaphthalene, 2,3-dihydroxynaphthalene, and 1,6-dihydronaphthalene.

3. The process according to claim 1, wherein, during c, the monomers and the salt (S1) are reacted together in the presence of a solvent.

4. The process according to claim 1, wherein the α,ω difluorinated compounds (M1') and (M1") are selected, independently from each other, from the group consisting of at least one of 4,4'-difluorobenzophenone and 1,4-bis(4'-fluorobenzoyl)benzene.

5. The process according to claim 1, wherein the alkali metal (A) is selected from the group consisting of sodium, potassium and mixtures thereof.

6. The process according to claim 5, wherein the salt (S1) is a mixture of sodium carbonate and potassium carbonate and the fluoride salt (S2) is a mixture of sodium fluoride and potassium fluoride.

7. The process according to claim 1, wherein the salt (S3) is lithium chloride, and the fluoride salt (S4) is lithium fluoride.

8. The process according to claim 1, further comprising:
prior to a, b or c, evacuating at least once the reactor under vacuum, and filling at least once the reactor with an inert gas, then;
putting the reactor under a constant purge of the inert gas until the end of d.

9. The process according to claim 1, wherein the salt (S1) is in the form of a powder and purged with an inert gas, before it is added to the reactor.

10. A poly(aryletherketone) comprising end groups, wherein
more than 40% of the end groups are fluoride end groups, based on the total number of the end groups of the poly(aryletherketone); and the poly-(aryletherketone) meets at least one of the following conditions:
Condition 1: the poly(aryletherketone) comprises fluoride end groups, and complies with the relation:

$$[F] \cdot V_M^{0.29} > 265$$

wherein:
[F] is the content of the fluoride end groups, expressed in µeq/g, and
$V_M$ is the melt viscosity of the poly(aryletherketone) at 410° C. and 46.4 $s^{-1}$, as measured according to ASTM D3835, expressed in (Pa·s);
Condition 2: less than 70 µeq/g of the end groups are end groups other than fluoride end groups;
Condition 3: the poly(aryletherketone) is in the form of a powder and has a lightness L* of above 86, a* and b* coordinates of respectively between −1 and 1, and between 4 and 16, as measured according to ASTM E308 using Cool White Fluorescent as illuminant; and
Condition 4: the poly(aryletherketone) has a melt viscosity ratio $VR_{40}$, defined as $$VR_{40} = V_{40}/V_{10},$$

of between 0.90 and 1.10, wherein $V_{10}$ and $V_{40}$ represent the melt viscosity at 400° C. and 10 rad/s respectively after 10 and 40 minutes, as measured according to ASTM D4440.

11. The process according to claim 1, wherein the poly(aryletherketone) (P) comprises end groups and meets at least one of the following conditions:
Condition 1: more than 40% of the end groups are fluoride end groups, based on the total number of the end groups of the poly(aryletherketone);
Condition 2: the poly(aryletherketone) comprises fluoride end groups, and complies with the relation:

$$[F] \cdot V_M^{0.29} > 265$$

wherein:
[F] is the content of the fluoride end groups, expressed in µeq/g, and
$V_M$ is the melt viscosity of the poly(aryletherketone) at 410° C. and 46.4 $s^{-1}$, as measured according to ASTM D3835, expressed in (Pa·s);
Condition 3: less than 70 µeq/g of the end groups are end groups other than fluoride end groups;
Condition 4: .the poly(aryletherketone) is in the form of a powder and has a lightness L* of above 86, a* and b* coordinates of respectively between −1 and 1, and between 4 and 16, as measured according to ASTM E308 using Cool White Fluorescent as illuminant; and
Condition 5: the poly(aryletherketone) has a melt viscosity ratio $VR_{40}$, defined as $$VR_{40} = V_{40}/V_{10},$$

of between 0.90 and 1.10, wherein $V_{10}$ and $V_{40}$ represent the melt viscosity at 400° C. and 10 rad/s respectively after 10 and 40 minutes, as measured according to ASTM D4440.

12. The process according to claim 1, wherein the poly(aryletherketone) (P) comprises end groups, more than 40% of said end groups being fluoride end groups, based on the total number of the end groups of the poly(aryletherketone) (P).

13. The process according to claim 1, wherein the poly(aryletherketone) (P) is a poly(etheretherketone) homopolymer, of which essentially all the recurring units are of formula (VII)

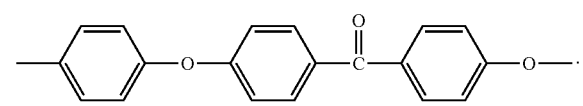

(VII)

14. The process according to claim 1, wherein the poly(aryletherketone) (P*) has an intrinsic viscosity $\eta_{int}^*$, as measured in methane sulfonic at 30° C. according to ASTM D2857, above 0.75 and below 1.5.

15. The process according to claim 1, wherein the poly(aryletherketone) (P*) has an intrinsic viscosity $\eta_{int}^*$, as measured in methane sulfonic at 30° C. according to ASTM D2857, above 0.8 and below 1.4.

16. The process according to claim 1, wherein, at the completion of c, the ratio $$[n_{M1} + (n_{M3}/2)]/[n_{M2} + (n_{M3}/2)]$$

is above 0.999 and below 1.02.

17. The process according to claim 1, wherein, at the beginning of the addition of the salt (S3), the ratio $$[n_{M1} + n_{M1'} + (n_{M3}/2)]/[n_{M2} + (n_{M3}/2)]$$

is above 1.04 and below 1.25.

18. The process according to claim 1, wherein, at the beginning of the addition of the salt (S3), the ratio $$[n_{M1} + n_{M1'} + (n_{M3}/2)]/[n_{M2} + (n_{M3}/2)]$$

is above 1.05 and below 1.20.

19. The process according to claim 1, wherein, at the completion of d, the ratio $$[n_{M1} + n_{M1'} + n_{M1''} + (n_{M3}/2)]/[n_{M2} + (n_{M3}/2)]$$

is above 1.10 and below 1.20.

20. The process according to claim 1, wherein the poly(aryletherketone) (P) which is formed from the poly(aryletherketone) (P*) in accordance with d, has an intrinsic viscosity $\eta_{int}$ above $0.95 \cdot \eta_{int}^*$ and below $1.05 \cdot \eta_{int}^*$.

* * * * *

UNITED STATES PATENT AND TRADEMARK OFFICE
CERTIFICATE OF CORRECTION

PATENT NO. : 8,642,713 B2  
APPLICATION NO. : 12/672244  
DATED : February 4, 2014  
INVENTOR(S) : Louis et al.

Page 1 of 1

It is certified that error appears in the above-identified patent and that said Letters Patent is hereby corrected as shown below:

In the Claims

Column 23, line 32, claim 1, "one a monofluorinated," should read --one α monofluorinated,--

Column 15, line 42, claim 1, "30° C." should read --30°C--

Column 23, line 46, claim 1, "25° C." should read --25°C--

Column 23, line 64, claim 1, "25° C." should read --25°C--

Column 23, line 65, claim 1, "25° C.;" should read --25°C;--

Column 25, line 27, claim 10, "410° C." should read --410°C--

Column 25, line 41, claim 10, "400° C." should read --400°C--

Column 25, line 57, claim 11, "410° C." should read --410°C--

Column 25, line 61, claim 11, "Condition 4:." should read --Condition 4:--

Column 26, line 9, claim 11, "400° C." should read --400°C--

Column 26, line 32, claim 14, "30° C." should read --30°C--

Column 26, line 36, claim 15, "30° C." should read --30°C--

Signed and Sealed this  
Twentieth Day of May, 2014

Michelle K. Lee  
*Deputy Director of the United States Patent and Trademark Office*

UNITED STATES PATENT AND TRADEMARK OFFICE
CERTIFICATE OF CORRECTION

PATENT NO.        : 8,642,713 B2
APPLICATION NO.   : 12/672244
DATED             : February 4, 2014
INVENTOR(S)       : Louis et al.

It is certified that error appears in the above-identified patent and that said Letters Patent is hereby corrected as shown below:

In the Claims

Column 23, line 32, claim 1, "one a monofluorinated," should read --one α monofluorinated,--

Column 23, line 42, claim 1, "30° C." should read --30°C--

Column 23, line 46, claim 1, "25° C." should read --25°C--

Column 23, line 64, claim 1, "25° C." should read --25°C--

Column 23, line 65, claim 1, "25° C.;" should read --25°C;--

Column 25, line 27, claim 10, "410° C." should read --410°C--

Column 25, line 41, claim 10, "400° C." should read --400°C--

Column 25, line 57, claim 11, "410° C." should read --410°C--

Column 25, line 61, claim 11, "Condition 4:." should read --Condition 4:--

Column 26, line 9, claim 11, "400° C." should read --400°C--

Column 26, line 32, claim 14, "30° C." should read --30°C--

Column 26, line 36, claim 15, "30° C." should read --30°C--

This certificate supersedes the Certificate of Correction issued May 20, 2014.

Signed and Sealed this
Ninth Day of September, 2014

Michelle K. Lee
*Deputy Director of the United States Patent and Trademark Office*